(12) United States Patent
Lu et al.

(10) Patent No.: US 11,899,770 B2
(45) Date of Patent: Feb. 13, 2024

(54) VERIFICATION METHOD AND APPARATUS, AND COMPUTER READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Tingyu Lu, Beijing (CN); Zi Jin, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 364 days.

(21) Appl. No.: 17/413,281

(22) PCT Filed: Aug. 13, 2019

(86) PCT No.: PCT/CN2019/100286
§ 371 (c)(1),
(2) Date: Jun. 11, 2021

(87) PCT Pub. No.: WO2020/119157
PCT Pub. Date: Jun. 18, 2020

(65) Prior Publication Data
US 2022/0067136 A1    Mar. 3, 2022

(30) Foreign Application Priority Data
Dec. 14, 2018    (CN) .......................... 201811531104.X (51) Int. Cl.
G06F 21/34    (2013.01)
H04L 9/32    (2006.01)

(52) U.S. Cl.
CPC ............ *G06F 21/34* (2013.01); *H04L 9/3236* (2013.01)

(58) Field of Classification Search
None
See application file for complete search history.

(56) References Cited

U.S. PATENT DOCUMENTS

2013/0312073 A1    11/2013    Srivastav
2016/0036805 A1    2/2016    Lin
(Continued)

FOREIGN PATENT DOCUMENTS

CN    103368916 A    10/2013
CN    105828454 A    8/2016
(Continued)

OTHER PUBLICATIONS

International Search Report dated Nov. 5, 2019 in PCT/CN2019/100286 (with English translation), 11 pages.
(Continued)

*Primary Examiner* — Benjamin E Lanier
(74) *Attorney, Agent, or Firm* — Oblon, McClelland, Maier & Neustadt, L.L.P.

(57) ABSTRACT

The verification method includes: acquiring a value of at least one type of to-be-verified configuration information of a hardware device of a user; generating to-be-verified information of the user according to the value of the to-be-verified configuration information; and comparing the to-be-verified information with stored identity verification information of the user to verify identity of the user.

14 Claims, 4 Drawing Sheets

(56) References Cited

U.S. PATENT DOCUMENTS

| | | | | |
|---|---|---|---|---|
| 2016/0337351 A1* | 11/2016 | Spencer | .............. | H04L 63/0876 |
| 2017/0126640 A1* | 5/2017 | Vincent | ................ | H04L 63/083 |
| 2018/0146363 A1 | 5/2018 | Liu et al. | | |
| 2020/0045136 A1* | 2/2020 | Swengler | .............. | G06F 16/137 |
| 2020/0077265 A1* | 3/2020 | Singh | ................ | H04L 63/0272 |

FOREIGN PATENT DOCUMENTS

| | | | | | |
|---|---|---|---|---|---|
| CN | 106456800 A | 2/2017 | | | |
| CN | 106650404 A | 5/2017 | | | |
| CN | 106952096 A | 7/2017 | | | |
| CN | 106453437 B | * 12/2019 | ......... | H04L 63/0876 |
| WO | WO-2013138714 A1 | * 9/2013 | ............. | G06F 21/31 |

OTHER PUBLICATIONS

International Preliminary Report on Patentability and Written Opinion of the International Searching Authority dated Jun. 8, 2021 in PCT/CN2019/100286 (submitting English translation only), 5 pages.
Combined Chinese Office Action and Search Report dated Jan. 12, 2021 in Chinese Patent Application No. 201811531104.X (with English translation), 16 pages.

* cited by examiner

VERIFICATION METHOD AND APPARATUS, AND COMPUTER READABLE STORAGE MEDIUM

CROSS-REFERENCE TO RELATED DISCLOSURES

The present application is based on and claims the priority to the Chinese Patent Application No. 201811531104.X, filed on Dec. 14, 2018, the disclosure of which is hereby incorporated in its entirety into the present application.

TECHNICAL FIELD

The present disclosure relates to the field of computer technology, and in particular, to a verification method, apparatus, and a computer-readable storage medium.

BACKGROUND

As Internet technology gradually grew deep into people's life, Internet security becomes more and more important. Especially for platforms with higher security requirements such as banks and Internet finance, user identity verification is key to secure transactions.

User's account number, password, and etc. may be stolen. Therefore, various Internet platforms need to incorporate other information of the user to improve security. At present, common information comprises IP address, Cookie information and the like.

SUMMARY

The inventors have found that: since there are many users under the same one IP address and the dynamic IP allocation technique in the mobile network, the resolution and accuracy of discriminating the users by using the IP address is poor. Cookie information of the users is locally stored, and the users can clear local data, so that the users cannot be discriminated by utilizing the Cookie information. The solution of the related art cannot accurately discriminate and verify the users.

A technical problem to be solved by the present disclosure is to improve the accuracy of user identity verification.

According to some embodiments of the present disclosure, there is provided a verification method comprising: acquiring a value of at least one type of to-be-verified configuration information of a hardware device of a user; generating to-be-verified information of the user according to the value of the to-be-verified configuration information; and comparing the to-be-verified information with stored identity verification information of the user to verify identity of the user.

In some embodiments, that generating to-be-verified information of the user according to the value of the to-be-verified configuration information comprises: under the condition that the to-be-verified configuration information comprises multiple types of to-be-verified configuration information, combining values of the types of to-be-verified configuration information in a preset order, and generating a hash value as the to-be-verified information of the user according to the combined information.

In some embodiments, that comparing the to-be-verified information with stored identity verification information of the user to verify identity of the user comprises: searching for the stored identity verification information of the user according to account information of the user; under the condition that the to-be-verified information is consistent with the identity verification information of the user, determining that the account information of the user is secure; and under the condition that the to-be-verified information is inconsistent with the identity verification information of the user, determining that the account information of the user is risky.

In some embodiments, the method further comprises: for each candidate user, acquiring values of multiple types of candidate configuration information of the hardware device of the candidate user; determining discrimination of the types of candidate configuration information to the candidate users according to the values of the types of candidate configuration information; and selecting one or more types of candidate configuration information as the to-be-verified configuration information, according to the discrimination of the types of candidate configuration information to the candidate users.

In some embodiments, that determining discrimination of the types of candidate configuration information to the candidate users according to the values of the types of candidate configuration information comprises: for each type of candidate configuration information, determining the number of value types of the candidate configuration information, and determining discrimination of the candidate configuration information to the candidate users according to comparison between the number of the value types and the number of the candidate users; and that selecting one or more types of candidate configuration information as the to-be-verified configuration information comprises: selecting one or more types of candidate configuration information with corresponding discrimination greater than a first threshold as the to-be-verified configuration information.

In some embodiments, that determining discrimination of the types of candidate configuration information to the candidate users according to the values of the types of candidate configuration information further comprises: selecting a preset number of types of candidate configuration information each time for combination, from the selected types of candidate configuration information, and for each combination, determining discrimination of the combination to the candidate users according to comparison between the number of the value types of the combination and the number of the candidate users, wherein each combination contains non-identical types of candidate configuration information; and that selecting one or more types of candidate configuration information as the to-be-verified configuration information comprises: selecting a combination with corresponding discrimination greater than a second threshold, and taking candidate configuration information in the selected combination as the to-be-verified configuration information.

In some embodiments, the method further comprises: under the condition that the account information of the user is risky, performing security verification on the account of the user; and under the condition that the security verification is passed, binding the identity verification information with the account information of the user and storing it.

According to further embodiments of the present disclosure, there is provided a verification apparatus comprising: an acquisition module, configured to acquire a value of at least one type of to-be-verified configuration information of a hardware device of a user; a verification information generation module, configured to generate to-be-verified information of the user according to the value of the to-be-verified configuration information; and a verification module, configured to compare the to-be-verified information with stored identity verification information of the user to verify identity of the user.

In some embodiments, the verification information generation module is configured to combine, under the condition that the to-be-verified configuration information comprises multiple types of to-be-verified configuration information, values of the types of to-be-verified configuration information in a preset order, and generate a hash value as the to-be-verified information of the user according to the combined information.

In some embodiments, the verification module is configured to search for the stored identity verification information of the user according to account information of the user; under the condition that the to-be-verified information is consistent with the identity verification information of the user, determine that the account information of the user is secure; and under the condition that the to-be-verified information is inconsistent with the identity verification information of the user, determine that the account information of the user is risky.

In some embodiments, the apparatus further comprises: a screening module, configured to acquire, for each candidate user, values of multiple types of candidate configuration information of hardware device of the candidate user; determine discrimination of the types of candidate configuration information to the candidate users according to the values of the types of candidate configuration information; and select one or more types of candidate configuration information as the to-be-verified configuration information according to the discrimination of the types of candidate configuration information to the candidate users.

In some embodiments, the screening module is configured to determine, for each type of candidate configuration information, the number of value types of the candidate configuration information, and determine discrimination of the candidate configuration information to the candidate users according to comparison between the number of the value types and the number of the candidate users; and select one or more types of candidate configuration information with corresponding discrimination greater than a first threshold as the to-be-verified configuration information.

In some embodiments, the screening module is configured to select a preset number of types of candidate configuration information each time for combination, from the selected types of candidate configuration information, and determine, for each combination, discrimination of the combination to the candidate users according to comparison between the number of the value types of the combination and the number of the candidate users, wherein each combination contains non-identical types of candidate configuration information; and select a combination with corresponding discrimination greater than a second threshold, and take candidate configuration information in the selected combination as the to-be-verified configuration information.

In some embodiments, the apparatus further comprises: a security prompting module, configured to perform security verification on the account of the user under the condition that the account information of the user is risky; and an information binding module, configured to bind the identity verification information with the account information of the user and store it under the condition that the security verification is passed.

According to further embodiments of the present disclosure, there is provided a verification apparatus comprising: a processor; and a memory coupled to the processor, having stored thereon instructions which, when executed by the processor, cause the processor to perform the verification method of any of the embodiments above.

According to still further embodiments of the present disclosure, there is provided a computer-readable non-transitory storage medium having stored thereon a computer program which, when executed by a processor, causes the processor to perform the verification method of any of the embodiments above.

According to the present disclosure, the to-be-verified information is generated by utilizing the value of the to-be-verified configuration information of the hardware device of the user, and the user is verified by comparing the to-be-verified information with the identity verification information. Due to a different preference and identity of each user, the to-be-verified configuration information of the hardware device is different, and the hardware device used by the user is usually fixed and is not easy to be tampered or acquired, and thus, the security of user identity verification can be improved by using the configuration information of the hardware device of the user.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings described herein are used to provide a further understanding of the present disclosure, and constitute a part of this disclosure, and the illustrative embodiments of the present disclosure, together with the description thereof, serve to explain but not to improperly limit the present disclosure. In the drawings.

DETAILED DESCRIPTION

The technical solutions in the embodiments of the present disclosure will be described clearly and completely with reference to the accompanying drawings in the embodiments of the present disclosure, and it is obvious that the embodiments described are only some of the embodiments of the present disclosure, rather than all embodiments. The following description of at least one exemplary embodiment is merely illustrative in nature and is in no way intended to limit the present disclosure, and its application, or use. All other embodiments, which can be derived by those skilled in the art from the embodiments disclosed herein without making any creative effort, shall fall within the protection scope of the present disclosure.

The present disclosure provides a verification method for verifying a user identity, which is described below in conjunction with FIG. 1.

Figure 1:
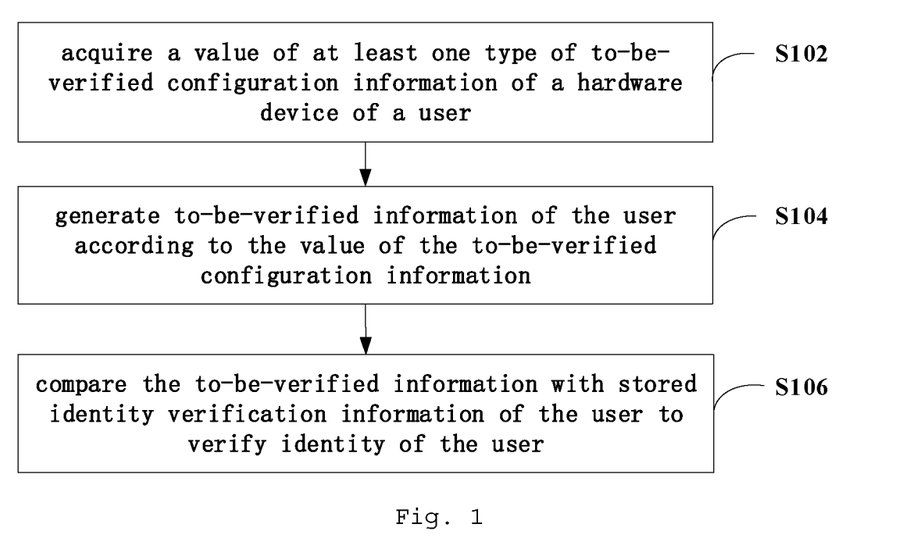
FIG. 1 shows a schematic flow diagram of a verification method according to some embodiments of the present disclosure.

FIG. 1 is a flow diagram of some embodiments of the verification method of the present disclosure. As shown in FIG. 1, the method of the embodiments comprises steps S102 to S106.

In step S102, a value of at least one type of to-be-verified configuration information of a hardware device of a user is acquired.

The configuration information of the hardware device comprises, for example: operating system identification, plug-in identification, hardware identification of the device, font setting information, UA (User Agent), application version (App Version), browser identification, language setting information, screen resolution, IMEI (International Mobile Equipment Identity), etc., and one or more types of the information is taken as the to-be-verified configuration information. In order to improve the accuracy of identity recognition, multiple items of to-be-verified configuration information in the above to-be-verified configuration information are generally comprised. The to-be-verified configuration information can be acquired under the condition that the user opens a browser, an application (App) or a login page of an Internet platform.

In step S104, to-be-verified information of the user is generated according to the value of the to-be-verified configuration information.

In some embodiments, under the condition that the to-be-verified configuration information comprises multiple types of to-be-verified configuration information, values of the types of to-be-verified configuration information are combined in a preset order, and a hash value is generated as the to-be-verified information of the user according to the combined information. The values of the multiple types of to-be-verified configuration information need to be arranged in a certain order, so that the accuracy of the subsequent identity verification can be ensured. A hash value is generated from the values of the to-be-verified configuration information by using a hash algorithm, which improves the security of the values of the to-be-verified configuration information and the accuracy of the verification.

In step S106, the to-be-verified information is compared with stored identity verification information of the user to verify identity of the user.

The identity verification information of the user can be stored in a database, and by comparing the to-be-verified information with the identity verification information of the user, it can be identified which hardware device the hardware device is, and then it can be determined which user the corresponding user is. The database can also be stored with a user blacklist comprising identity verification information corresponding to illegal users, and by comparing the generated identity verification information and identity verification information of the user, it can be identified that a hardware device is an illegal one and its corresponding user is an illegal one.

The stored identity verification information of the user can be bound with account information of the user, which comprises, for example, an account number registered on an Internet platform, a password (e.g., number, fingerprint, face, etc.), and the like. The stored identity verification information of the user can be searched for according to the account information of the user. Under the condition that the to-be-verified information is consistent with the identity verification information of the user, it is determined that the account information of the user is secure; and under the condition that the to-be-verified information is inconsistent with the identity verification information of the user, it is determined that the account information of the user is risky.

The account information of the user can be bound with multiple items of identity verification information, that is, the account information of the user can correspond to multiple hardware devices commonly used. An item of identity verification information can also be bound with multiple account information, for example, multiple account information can be logged on through a computer shared by family members.

Different from the related art in which it is notified that the account information of the user is risky, etc., through a change in an IP address, it is more accurate to verify the user identity by using the configuration information of the hardware device, because the IP address may be usually converted frequently, while the hardware device used by the user is relatively fixed. The account number is likely to be stolen when the account information of the user is logged on to another device, and therefore, the security of the account can be improved by binding the configuration information of the hardware device with the account information of the user.

In some embodiments, the to-be-verified information based on the user, together with the account information of the user, can be taken as the verification information for verifying the user. The to-be-verified configuration information of the hardware device is transparent to the user, and verification can be completed without user's operation. The account information of the user can be acquired by means of user's input, etc. The security of Internet operation is improved by using double verification of the to-be-verified information and the account information. It can be effectively avoided that the stolen account number of the user is operated on another device.

In the method of the above embodiments, the identity verification information of the user is generated by using the configuration information of the hardware device of the user, and the user is verified through the identity verification information. Due to a different preference and identity, etc., of each user, the configuration information of the hardware device is different, and the hardware device used by the user is usually fixed and is not easy to be tampered or acquired, and thus, the security of user identity verification can be improved by using the configuration information of the hardware device of the user.

Other embodiments of the verification method of the present disclosure are described below in conjunction with FIG. 2.

Figure 2:
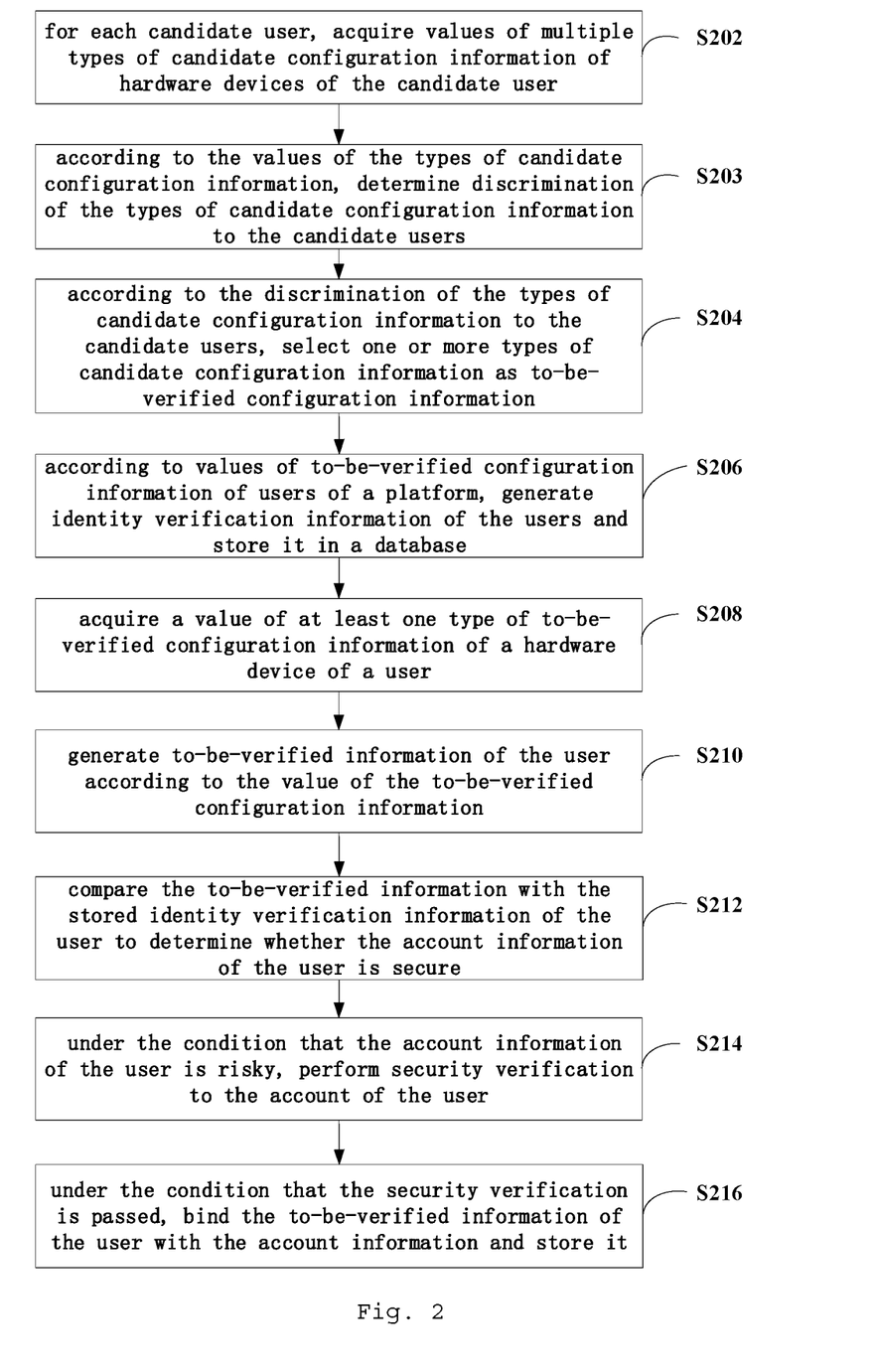
FIG. 2 shows a schematic flow diagram of a verification method according to other embodiments of the present disclosure.

FIG. 2 is a flow diagram of other embodiments of the verification method of the present disclosure. As shown in FIG. 2, the method of the embodiments comprises steps S202 to S216.

In step S202, for each candidate user, values of multiple types of candidate configuration information of hardware devices of the candidate user are acquired. The candidate users can comprise the user in the above embodiments.

In the above embodiments, multiple types of configuration information of a hardware device are listed, but not each type of configuration information needs to be applied. The more types of applied information, the more computation complexity, and if too few types of information are applied, each hardware device or its corresponding user cannot be discriminated. Therefore, it is needed to screen the configuration information of the hardware device, so as to select one or more types as to-be-verified configuration information.

The candidate configuration information comprises, for example, at least one type of the following: operating system identification, plug-in identification, hardware identification of the device, font setting information, UA, App Version, browser identification, language setting information, screen resolution, IMEI, etc.

In step S203, according to the values of the types of candidate configuration information, discrimination of the types of candidate configuration information to the candidate users is determined.

In step S204, according to the discrimination of the types of candidate configuration information to the candidate users, one or more types of candidate configuration information is selected as to-be-verified configuration information.

In some embodiments, for each type of candidate configuration information, the number of value types of the candidate configuration information is determined, and discrimination of the candidate configuration information to the candidate users is determined according to comparison between the number of the value types and the number of the candidate users. One or more types of candidate configuration information with corresponding discrimination greater than a first threshold are selected as the to-be-verified configuration information. For each type of candidate configuration information, a ratio of the number of the value types of the candidate configuration information to the number of the candidate users can be taken as the discrimination to the candidate users. For example, values of the operating system identification of the candidate users comprise two types of IOS and Android, and the number of the candidate users is 100, then discrimination of the operating system identification to the candidate users is 1/50.

In some embodiments, a preset number of types of candidate configuration information is selected each time for combination, from the selected types of candidate configuration information, and for each, discrimination of the combination to the candidate users is determined according to comparison between the number of the value types of the combination and the number of the candidate users, wherein each combination contains non-identical types of candidate configuration information. A combination with a corresponding discrimination greater than a second threshold is selected, and candidate configuration information in the selected combination is taken as the to-be-verified configuration information. Further, for each combination, the number of the value types of the combination is, for example, a product of the number of value types of each type of candidate configuration information in the combination and the number of types of the candidate configuration information in the combination. Further, a ratio of the number of the value types of the combination to the number of the candidate users can be taken as the discrimination of the combination to the candidate users. For example, a combination comprises two types of candidate configuration information, namely, operating system identification and browser identification, and values of the operating system identification of candidate users comprise two types of IOS and Android, values of the browser identification comprise two types of IE and Google, and the number of the candidate users is 100, then the discrimination of the combination to the candidate users is 1/25.

In some embodiments, any two or more types of candidate configuration information can be combined, the discrimination of each combination to the candidate users is determined, a combination whose corresponding discrimination is greater than a second threshold and in which information length is the shortest can be selected, and candidate configuration information in the selected combination is taken as the to-be-verified configuration information. In this way, the calculation amount of the to-be-verified information can be reduced under the condition that the discrimination to the candidate users is ensured. The selected candidate configuration information combination can discriminate each different hardware device or candidate user as far as possible.

The number of the value types of the candidate configuration information described above refers to the number of the actually collected value types corresponding to the candidate users, rather than the number of value types that can be set by the candidate configuration information. For example, a hardware device can support more than 30 language settings, but actually collected language setting information corresponding to the candidate users comprises only three types of English, simplified Chinese and traditional Chinese, then the number of value types of the language setting information is 3.

In step S206, identity verification information of the users is generated according to values of to-be-verified configuration information of users of a platform and stored in a database. The users of the platform may comprise the candidate users.

A hash value generated from the values of the to-be-verified configuration information of the users by using a hash algorithm is taken as the identity verification information of the user. The above steps relate to a process of generating the identity verification information of the user, and can be performed off line. The identity verification information can be associated with the account information of the user in the database. The association between the identity verification information and the account information can be performed automatically when the user registers or logs on to the account for the first time.

In step S208, a value of at least one type of to-be-verified configuration information of a hardware device of a user is acquired.

In step S210, to-be-verified information of the user is generated according to the value of the to-be-verified configuration information.

In step S212, the to-be-verified information is compared with the stored identity verification information of the user to determine whether the account information of the user is secure.

If the to-be-verified information is compared to be consistent with the stored identity verification information of the user, it is considered that the account information of the user is secure, otherwise, it is determined that the account information of the user is risky.

In step S214, under the condition that the account information of the user is risky, security verification to the account of the user is performed.

The solution in the related art can be used for performing the security verification to the account of the user, for example, a verification code is sent to a mobile phone number bound with the user and input by the user for verification, or fingerprint or face verification of the user is performed.

In step S216, under the condition that the security verification is passed, the to-be-verified information of the user is bound with the account information and stored.

The security verification being passed shows that the user confirms that the hardware device has been replaced and secure account operation has been performed, so that the account information of the user can be bound with the to-be-verified information, and the to-be-verified information is stored as the identity information of the user, which avoids the subsequent repeated need for security verification by the user. The stored identity verification information of the user can be set within a corresponding expiration date, the user is needed to log on to the account again or perform security verification past the expiration date, and then the to-be-verified information is bound with the account information of the user and stored.

In view of the solution of the above embodiments, according to the discrimination to the candidate users, the candidate configuration information is selected as the to-be-verified configuration information to generate the to-be-verified information of the user, which improves the verification accuracy, and meanwhile, reduces the calculation amount of the to-be-verified information and the identification verification information. The security verification of the account information of the user is performed by using the to-be-verified information and the identity verification information, which improves the security of Internet operations.

The identity verification information generated according to the to-be-verified configuration information of the hardware device can be used for not only identifying the user identity, but also analyzing the behaviors of the user operating the hardware device. In some embodiments, it is determined whether there are malicious purchase operations according to the number of times of the purchase operations corresponding to the to-be-verified information and/or the account information. In an e-commerce platform, there are often malicious purchase behaviors such as "click farming" (a merchant impersonates customers to make purchases or comments) to increase sales or favorable comments, to deceive consumers. A malicious "click farming" user will typically register multiple accounts with a fixed hardware device to purchase a large number of items. In view of this characteristic, if at least one of the number of times of the purchase operations and the number of the accounts corresponding to the to-be-verified information exceeds a corresponding number of times threshold or number of accounts threshold, it is considered that the user corresponding to the to-be-verified information has the malicious purchase operations. In this way, the probability of the merchants in the e-commerce platform deceiving consumers can be reduced.

In some embodiments, a relationship between users is determined according to the account information corresponding to the to-be-verified information, and an user portrait (persona) is perfected according to the relationship between the users. The to-be-verified information can correspond to multiple account information, and if the number of login times of the multiple accounts exceeds the number of times threshold within a preset time period, it can be determined that the multiple accounts have a family relationship. The determination of the association between the accounts can provide the users with more accurate services, and improve user experience.

The present disclosure also provides a verification apparatus as described below in conjunction with FIG. 3.

Figure 3:
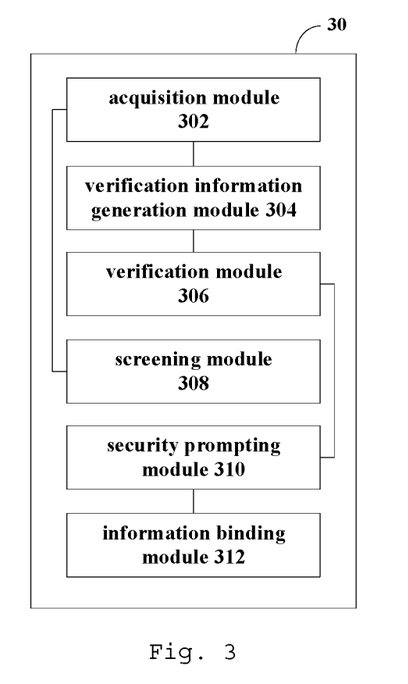
FIG. 3 shows a schematic structural diagram of a verification apparatus according to some embodiments of the present disclosure.

FIG. 3 is a structural diagram of some embodiments of the verification apparatus of the present disclosure. As shown in FIG. 3, the apparatus 30 of the embodiments comprises: an acquisition module 302, a verification information generation module 304, and a verification module 306.

The acquisition module 302 is configured to acquire configuration information of a hardware device of a user.

The verification information generation module 304 is configured to generate to-be-verified information of the user according to a value of the to-be-verified configuration information.

In some embodiments, the verification information generation module 304 is configured to combine, under the condition that the to-be-verified configuration information comprises multiple types of to-be-verified configuration information, values of the types of to-be-verified configuration information in a preset order, and generate a hash value as the to-be-verified information of the user according to the combined information.

The verification module 306 is configured to compare the generated identity verification information with stored identity verification information to verify identity of the user.

In some embodiments, the verification module 306 is configured to search for the stored identity verification information of the user according to account information of the user; under the condition that the to-be-verified information is consistent with the identity verification information of the user, determine that the account information of the user is secure; and under the condition that the to-be-verified information is inconsistent with the identity verification information of the user, determine that the account information of the user is risky.

In some embodiments, the verification apparatus 30 further comprises: a screening module 308 configured to acquire, for each candidate user, values of multiple types of candidate configuration information of hardware devices of the candidate user; determine discrimination of the types of candidate configuration information to the candidate users according to the values of the types of candidate configuration information; and select one or more types of candidate configuration information as the to-be-verified configuration information according to the discrimination of the types of candidate configuration information to the candidate users.

In some embodiments, the screening module 308 is configured to determine, for each type of candidate configuration information, the number of value types of the candidate configuration information, and determine discrimination of the candidate configuration information to the candidate users according to comparison between the number of the value types and the number of the candidate users; and select one or more types of candidate configuration information with corresponding discrimination greater than a first threshold as the to-be-verified configuration information.

In some embodiments, the screening module 308 is configured to select a preset number of types of candidate configuration information each time for combination, from the selected types of candidate configuration information, and determine, for each combination, discrimination of the combination to the candidate users according to comparison between the number of the value types of the combination and the number of the candidate users, wherein each combination contains non-identical types of candidate configuration information; and select a combination with corresponding discrimination greater than a second threshold, and take candidate configuration information in the selected combination as the to-be-verified configuration information.

In some embodiments, the verification apparatus 30 further comprises a security prompting module 310 and an information binding module 312. The security prompting module 310 is configured to perform security verification to the account of the user under the condition that the account information of the user is risky. The information binding module 312 is configured to bind the identity verification information of the user with the account information and store it under the condition that the security verification is passed.

The verification apparatus in the embodiments of the present disclosure can be implemented by various computing devices or computer systems, which are described below in conjunction with FIGS. 4 and 5.

Figure 4:
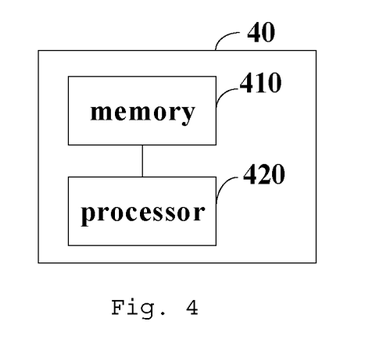
FIG. 4 shows a schematic structural diagram of a verification apparatus according to other embodiments of the present disclosure.

FIG. 4 is a structural diagram of some embodiments of the verification apparatus of the present disclosure. As shown in FIG. 4, the apparatus 40 of the embodiments comprises: a memory 410 and a processor 420 coupled to the memory 410, wherein the processor 420 is configured to perform the verification method in any of the embodiments of the present disclosure based on instructions stored in the memory 410.

The memory 410 herein can comprise, for example, a system memory, a fixed non-volatile storage media, etc. The system memory has stored thereon, for example, an operating system, an application program, a Boot Loader, a database, and other programs, etc.

Figure 5:
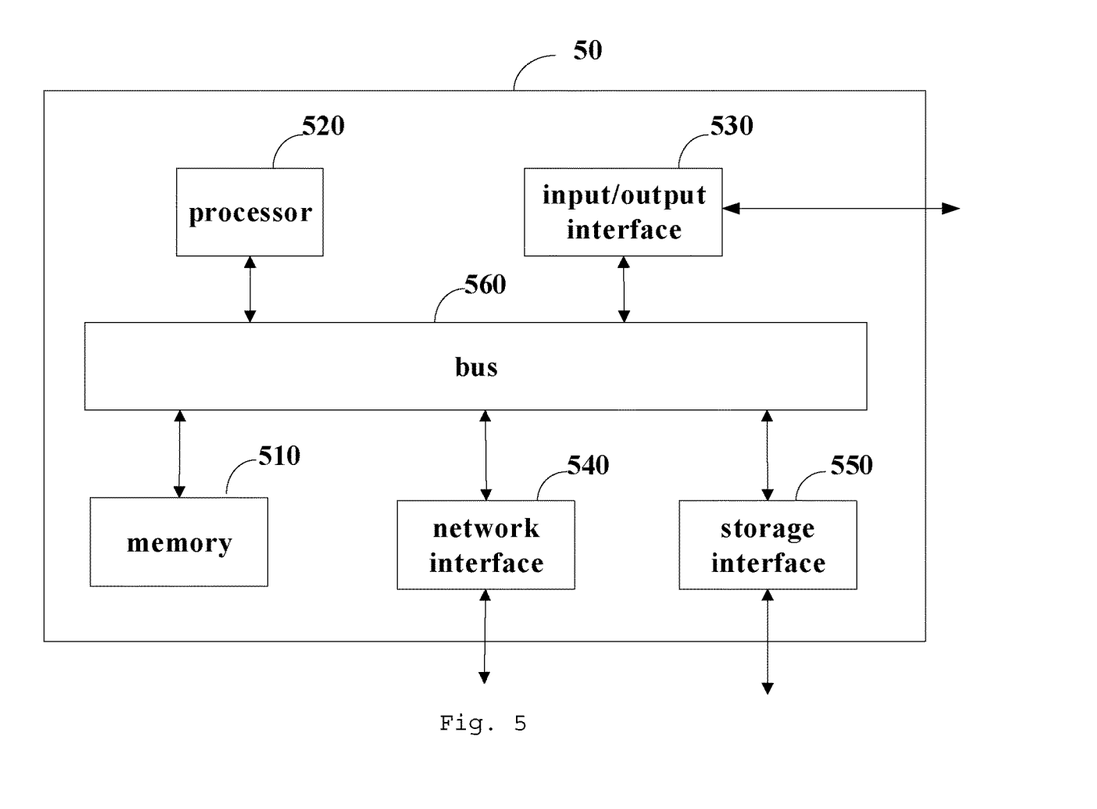
FIG. 5 shows a schematic structural diagram of a verification apparatus according to still other embodiments of the present disclosure.

FIG. 5 is a structural diagram of other embodiments of the verification apparatus of the present disclosure. As shown in FIG. 5, the apparatus 50 of the embodiments comprises: a memory 510 and a processor 520, which are similar to the memory 410 and processor 420, respectively. It can further comprise input/output interface 530, network interface 540, storage interface 550, etc. These interfaces 530, 540, 550, the memory 510 and the processor 520 can be connected, for example, through a bus 560. The input/output interface 530 herein provides a connection interface for input/output devices such as a display, a mouse, a keyboard, and a touch screen. The network interface 540 provides various networking devices with connection interfaces, which can be connected to, for example, a database server or a cloud storage server. The storage interface 550 provides connection interfaces for external storage devices such as a SD card and a USB disk.

As will be appreciated by one skilled in the art, the embodiments of the present disclosure may be provided as a method, system, or computer program product. Accordingly, the present disclosure may take the form of an entire hardware embodiment, an entire software embodiment or an embodiment combining software and hardware aspects. Furthermore, the present disclosure may take the form of a computer program product implemented on one or more computer-usable non-transitory storage media (comprising, but not limited to, disk storage, CD-ROM, optical storage, and so forth) having computer-usable program code embodied therein.

The present disclosure is described with reference to flow diagrams and/or block diagrams of the method, apparatus (system), and computer program product according to the embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which are executed by the processor of the computer or other programmable data processing apparatus, create means configured to implement functions specified in one or more flows of a flow diagram and/or one or more blocks of a block diagram.

These computer program instructions may also be stored in a computer-readable memory guiding a computer or other programmable data processing apparatus to work in a particular way, such that the instructions stored in the computer-readable memory produce an article of manufacture comprising instruction means which implement functions specified in one or more flows of a flow diagram and/or one or more blocks of a block diagram.

These computer program instructions may also be loaded onto a computer or other programmable data processing apparatus, such that a series of operational steps are performed on the computer or other programmable apparatus, so as to produce a computer-implemented process, and thus, the instructions executed on the computer or other programmable apparatus provide steps configured to implement functions specified in one or more flows of a flow diagram and/or one or more blocks of a block diagram.

The above is merely the preferred embodiments of the present disclosure, but is not used for limiting the present disclosure, and any modification, equivalent replacement and improvement, etc. within the spirit and principle of the present disclosure shall be covered within the protection scope of the present disclosure.

What is claimed is:

1. A verification method comprising:
acquiring a value of at least one type of to-be-verified configuration information of a hardware device of a user;
generating to-be-verified information of the user according to the value of the to-be-verified configuration information;
comparing the to-be-verified information with stored identity verification information of the user to verify identity of the user;
for each of candidate users, acquiring values of multiple types of candidate configuration information of hardware devices of the candidate user;
determining discrimination of the types of candidate configuration information to the candidate users according to the values of the multiple types of candidate configuration information; and
selecting one or more types of candidate configuration information as the to-be-verified configuration information according to the discrimination of the types of candidate configuration information to the candidate users, wherein:
the determining discrimination of the types of candidate configuration information to the candidate users according to the values of the types of candidate configuration information comprises:
for each type of candidate configuration information, determining a number of value types of the candidate configuration information, and determining discrimination of the candidate configuration information to the candidate users according to comparison between the number of the value types and a number of the candidate users; and
the selecting one or more types of candidate configuration information as the to-be-verified configuration information comprises:
selecting one or more types of candidate configuration information with corresponding discrimination greater than a first threshold as the to-be-verified configuration information.

2. The verification method according to claim 1, wherein the generating to-be-verified information of the user according to the value of the to-be-verified configuration information comprises:
under the condition that the to-be-verified configuration information comprises multiple types of to-be-verified configuration information, combining values of the multiple types of to-be-verified configuration information in a preset order, and generating a hash value as the to-be-verified information of the user according to the combined information.

3. The verification method according to claim 1, wherein the comparing the to-be-verified information with stored identity verification information of the user to verify identity of the user comprises:
- searching for the stored identity verification information of the user according to account information of the user;
- under the condition that the to-be-verified information is consistent with the identity verification information of the user, determining that the account information of the user is secure; and
- under the condition that the to-be-verified information is inconsistent with the identity verification information of the user, determining that the account information of the user is risky.

4. The verification method according to claim 1, wherein:
the determining discrimination of the types of candidate configuration information to the candidate users according to the values of the types of candidate configuration information further comprises:
- selecting a preset number of types of candidate configuration information each time for combination, from the selected types of candidate configuration information, and for each combination, determining discrimination of the combination to the candidate users according to comparison between the number of the value types of the combination and the number of the candidate users, wherein types of candidate configuration information comprised in each combination are not all identical; and
the selecting one or more types of candidate configuration information as the to-be-verified configuration information comprises:
- selecting a combination with corresponding discrimination greater than a second threshold, and taking candidate configuration information in the selected combination as the to-be-verified configuration information.

5. The verification method according to claim 3, further comprising:
- under the condition that the account information of the user is risky, performing security verification to an account of the user; and
- under the condition that the security verification is passed, binding the identity verification information with the account information of the user and storing.

6. A verification apparatus comprising:
a processor; and
a memory coupled to the processor, having stored thereon instructions which, when executed by the processor, cause the processor to perform a verification method comprising:
- acquiring a value of at least one type of to-be-verified configuration information of a hardware device of a user;
- generating to-be-verified information of the user according to the value of the to-be-verified configuration information;
- comparing the to-be-verified information with stored identity verification information of the user to verify identity of the user;
- for each of candidate users, acquire values of multiple types of candidate configuration information of hardware devices of the candidate user;
- determine discrimination of the types of candidate configuration information to the candidate users according to the values of the multiple types of candidate configuration information; and
- select one or more types of candidate configuration information as the to-be-verified configuration information according to the discrimination of the types of candidate configuration information to the candidate users, wherein:
the determining discrimination of the types of candidate configuration information to the candidate users according to the values of the types of candidate configuration information comprises:
- for each type of candidate configuration information, determining a number of value types of the candidate configuration information, and determining discrimination of the candidate configuration information to the candidate users according to comparison between the number of the value types and a number of the candidate users; and
the selecting one or more types of candidate configuration information as the to-be-verified configuration information comprises:
- selecting one or more types of candidate configuration information with corresponding discrimination greater than a first threshold as the to-be-verified configuration information.

7. The verification apparatus according to claim 6, wherein the generating to-be-verified information of the user according to the value of the to-be-verified configuration information comprises:
- under the condition that the to-be-verified configuration information comprises multiple types of to-be-verified configuration information, combining values of the multiple types of to-be-verified configuration information in a preset order, and generating a hash value as the to-be-verified information of the user according to the combined information.

8. The verification apparatus according to claim 6, wherein the comparing the to-be-verified information with stored identity verification information of the user to verify identity of the user comprises:
- searching for the stored identity verification information of the user according to account information of the user;
- under the condition that the to-be-verified information is consistent with the identity verification information of the user, determining that the account information of the user is secure; and
- under the condition that the to-be-verified information is inconsistent with the identity verification information of the user, determining that the account information of the user is risky.

9. The verification apparatus according to claim 6, wherein:
the determining discrimination of the types of candidate configuration information to the candidate users according to the values of the types of candidate configuration information further comprises:
- selecting a preset number of types of candidate configuration information each time for combination, from the selected types of candidate configuration information, and for each combination, determining discrimination of the combination to the candidate users according to comparison between the number of the value types of the combination and the number of the candidate users, wherein types of candidate configuration information comprised in each combination are not all identical; and the selecting one or more types of candidate configuration information as the to-be-verified configuration information comprises:

selecting a combination with corresponding discrimination greater than a second threshold, and taking candidate configuration information in the selected combination as the to-be-verified configuration information.

10. The verification apparatus according to claim 8, wherein the processor is further configured to:

under the condition that the account information of the user is risky, perform security verification to an account of the user; and under the condition that the security verification is passed, bind the identity verification information with the account information of the user and storing.

11. A computer-readable non-transitory storage medium having stored thereon a computer program which, when executed by a processor, causes the processor to perform steps of a method comprising:

acquiring a value of at least one type of to-be-verified configuration information of a hardware device of a user;

generating to-be-verified information of the user according to the value of the to-be-verified configuration information;

comparing the to-be-verified information with stored identity verification information of the user to verify identity of the user;

for each of candidate users, acquire values of multiple types of candidate configuration information of hardware devices of the candidate user;

determine discrimination of the types of candidate configuration information to the candidate users according to the values of the multiple types of candidate configuration information; and select one or more types of candidate configuration information as the to-be-verified configuration information according to the discrimination of the types of candidate configuration information to the candidate users, wherein:

the determining discrimination of the types of candidate configuration information to the candidate users according to the values of the types of candidate configuration information comprises:

for each type of candidate configuration information, determining a number of value types of the candidate configuration information, and determining discrimination of the candidate configuration information to the candidate users according to comparison between the number of the value types and a number of the candidate users; and the selecting one or more types of candidate configuration information as the to-be-verified configuration information comprises:

selecting one or more types of candidate configuration information with corresponding discrimination greater than a first threshold as the to-be-verified configuration information.

12. The computer-readable non-transitory storage medium according to claim 11, wherein:

the determining discrimination of the types of candidate configuration information to the candidate users according to the values of the types of candidate configuration information further comprises:

selecting a preset number of types of candidate configuration information each time for combination, from the selected types of candidate configuration information, and for each combination, determining discrimination of the combination to the candidate users according to comparison between the number of the value types of the combination and the number of the candidate users, wherein types of candidate configuration information comprised in each combination are not all identical; and the selecting one or more types of candidate configuration information as the to-be-verified configuration information comprises:

selecting a combination with corresponding discrimination greater than a second threshold, and taking candidate configuration information in the selected combination as the to-be-verified configuration information.

13. The computer-readable non-transitory storage medium according to claim 11, wherein the generating to-be-verified information of the user according to the value of the to-be-verified configuration information comprises:

under the condition that the to-be-verified configuration information comprises multiple types of to-be-verified configuration information, combining values of the multiple types of to-be-verified configuration information in a preset order, and generating a hash value as the to-be-verified information of the user according to the combined information.

14. The computer-readable non-transitory storage medium according to claim 11, wherein the comparing the to-be-verified information with stored identity verification information of the user to verify identity of the user comprises:

searching for the stored identity verification information of the user according to account information of the user;

under the condition that the to-be-verified information is consistent with the identity verification information of the user, determining that the account information of the user is secure; and under the condition that the to-be-verified information is inconsistent with the identity verification information of the user, determining that the account information of the user is risky.

* * * * *